Dec. 25, 1956 B. B. HAYWORTH 2,775,412

DEMOUNTABLE FILM REEL

Filed Oct. 16, 1952

INVENTOR.
BYRON B. HAYWORTH
BY
Carl R. Graham
ATTORNEY.

United States Patent Office 2,775,412

Patented Dec. 25, 1956

2,775,412

DEMOUNTABLE FILM REEL

Byron B. Hayworth, Los Angeles, Calif., assignor to Radio Corporation of America, a corporation of Delaware Application October 16, 1952, Serial No. 315,168

The terminal fifteen years of the term of the patent to be granted has been disclaimed 8 Claims. (Cl. 242—70)

This invention relates to reels for flexible strips, and particularly to demountable reel assemblies for winding picture and sound films thereon or for supplying such films therefrom.

It is well-known in motion picture production, that raw stock film is supplied on film spools and that film spools are used on reel hubs to wind film thereon. The present invention is directed to a film reel assembly which is symmetrical about a plane through the center of the film hub and perpendicular to the axis of the reel. Each flange of the reel is attachable and detachable from the hub by means of a positive latch mechanism which is so constructed as to prevent rattle while requiring a definite though easy effort to unlatch. Because of the symmetry of the structure, either flange may be used at either end of the hub and the reel may be assembled with either flange toward the collar of the driving spindle. Each flange may also be used on hubs of different lengths to accommodate films of different widths and a flange may be detached from a hub with a roll of film on the reel.

The principal object of the invention, therefore, is to facilitate the handling of films with reels.

Another object of the invention is to provide an improved demountable reel assembly.

A further object of the invention is to provide a reel assembly which is symmetrical about a plane through the center thereof and perpendicular to the axis of the reel, and the flanges of which are positively held in position on the hub of the reel.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figures 2, 3:
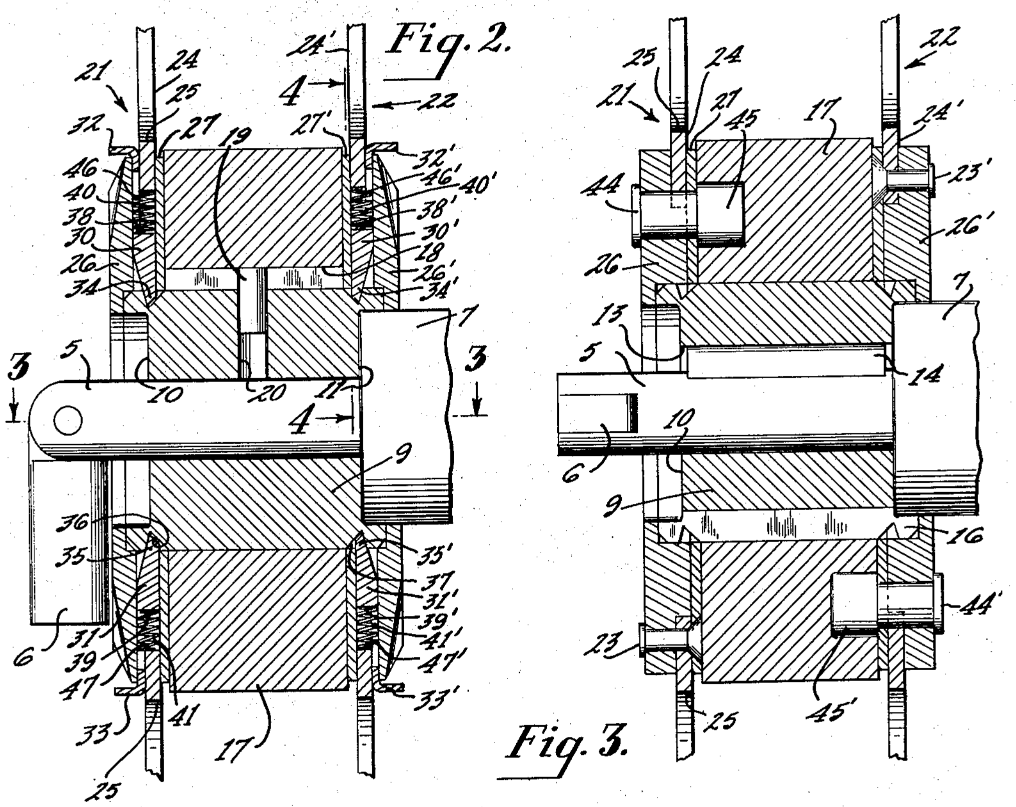
Fig. 2 is a cross-sectional view taken along the line 2—2 of Fig. 1.
Fig. 3 is a cross-sectional view taken along the line 3—3 of Fig. 2.

Referring now to the drawings, in which the same numerals identify like elements, a reel driving spindle has a shaft portion 5, a hinged latch portion 6, and a collar portion 7. Mounted on the spindle shaft and collar 7 is a reel hub 9 having counterbored recesses 10 and 11, the collar 7 being accommodated in recess 11, as shown in Figs. 2 and 3, Fig. 3 showing the assembly rotated ninety degrees from the position shown in Fig. 2. A keyway 13 is shown within the hub to accommodate a key 14 on the shaft 5. An outer keyway 16 is also shown in the hub 9 to accommodate a key which is provided on some film spools.

Mounted on the hub 9, is a film spool 17 which is provided with a keyway 18 and in which is shown the end of a pin 19, the other end of the pin being in a hole 20 at the center of the hub 9. Thus, the hub 9 is driven by the key 14 in keyway 13 and a spool 17 is driven by the pin 19 in the keyway 18 of the spool 17.

Mounted adjacent the ends of hub 9 are two flange assemblies 21 and 22. Each flange assembly is identical in construction so that one flange will be described by number and the corresponding parts of the other flange will be given the same numbers primed. Referring now to flange assembly 21, a flange 24 has a plurality of openings 25 therein, the flange being riveted by rivets 23 between an inner, annular collar 27 and an outer, annular collar 26. Positioned diametrically opposite one another, and within recesses in the outer collar 26 between the two collars 26 and 27, are rectangular latch members 30 and 31 having outer finger relief portions 32 and 33, respectively. The lower ends 34 and 35 of the latches 30 and 31, resepectively, are tapered to snugly fit into an annular groove 36 adjacent one end of hub 9, a similar groove 37 being provided adjacent the other end of hub 9. The angle of one side of the groove is approximately fifteen degrees to the surface of the hub, so as to form a snug fit and prevent forced disengagement.

Figures 1, 4:
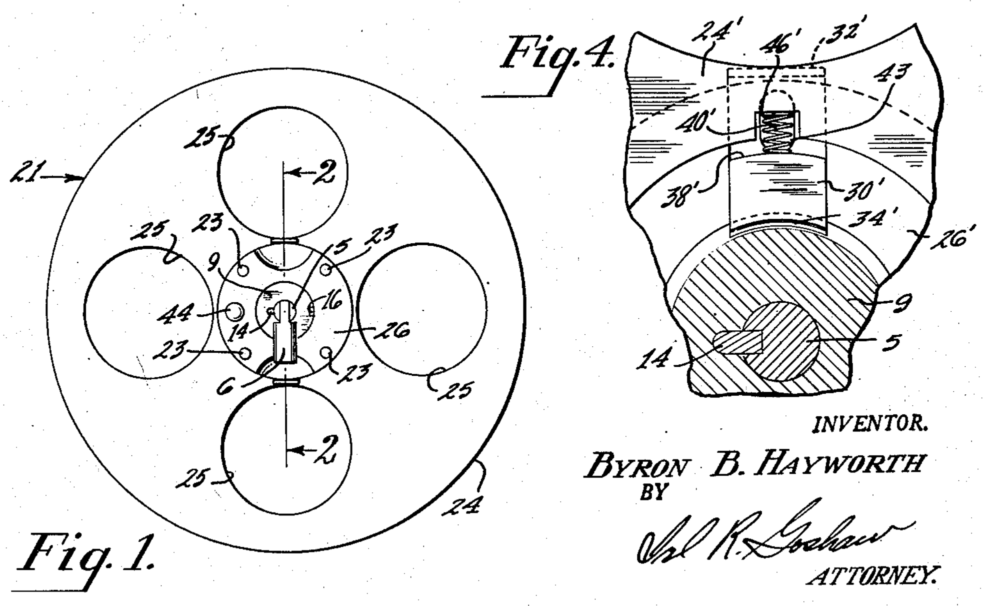
Fig. 1 is a side elevational view of a film reel assembly embodying the invention.
Fig. 4 is a detailed view taken along the line 4—4 of Fig. 2.

Springs 40 and 41 are positioned between shoulders 38 and 39 of latches 30 and 31, respectively, and against shoulders 46 and 47 of recesses in the flanges, such as shown at 43 in Fig. 4. The latches 30 and 31 are thus slidable radially from the axis of the shaft 5 against the tension of the springs 40 and 41 in a sufficient amount to permit the removal of the ends 34 and 35 from the groove 36. The flange may then be removed from the hub 9. To assemble the flange on the hub, it is only necessary to press it thereon after the latches have been moved radially until the tapered ends abut the hub 9.

To provide another means for driving the film spool 17, each flange is provided with a pin 44 adapted to have its inner end 45 fit into a cavity which is generally provided in all film spools.

There is thus provided a film reel assembly which may have the flanges thereof attached to and detached from the hub with or without film on the hub, and the flanges of which cannot be forcibly detached from the hub in the event a full reel of film is lifted by one flange. The same flange assembly may be used with hubs of different lengths to accommodate films of different widths.

I claim:

1. A film reel assembly for a driving spindle having a shaft portion comprising a hollow cylindrical hub adapted to be keyed to said spindle shaft portion, a film spool adapted to be keyed to said hub, said hub and spool being symmetrical about a plane through their centers and perpendicular to the axes of said hub and said spool, said hub having tapered annular grooves adjacent the ends thereof, and flanges adapted to be attached to each end of said hub adjacent the ends of said spool, said flanges each including resilient elements and latch members, said latch members having one end of each resiliently urged into one of said grooves at the end of said hub upon which it is mounted, the sides of the end of each latch member and said groove being tapered at an angle to prevent removal of said flanges from said hub by force applied thereto axially of said hub when the ends of said latch members are in said grooves.

2. A film reel assembly in accordance with claim 1 in which said hub is provided with an inner keyway to accommodate a key on said shaft to connect said spindle to said hub, said spool is provided with an inner keyway, and a pin is provided, said pin extending from said hub into the keyway of said spool to connect said hub to said spool.

3. A film reel in accordance with claim 1 in which said latch members have finger reliefs for manually removing the ends of said latch members from said grooves against the resiliency of said resilient elements.

4. A film reel assembly for a driving spindle having a shaft portion comprising a cylindrical film spool, a cylindrical hub on which said spool is mounted, said hub being adapted to be mounted on said shaft portion, said hub having a keyway for said spindle shaft and an annular groove adjacent each end thereof, a pair of film guiding flanges adapted to be mounted adjacent the ends of said spool and on said hub, each of said flanges including diametrically opposing latches with ends within one groove in said hub, radially positioned springs bearing against the latches for holding the ends of said latches in said grooves, one side of each of the ends of said latches and one side of each of said grooves being at an angle to prevent removal of said flanges by pressure thereon applied axially of said hub when the ends of said latches are in said grooves, and the other side of each of the ends of said latches being at an angle to permit attachment of said flanges to said hub by pressure thereon applied axially of said hub.

5. A film reel in accordance with claim 4 in which said latches have finger reliefs connected thereto for removing the ends of said latches from said grooves when said latches are moved radially against the resiliency of said springs.

6. A film reel in accordance with claim 4 in which said flanges have pins extending therefrom, said pins being accommodated in openings in said spool.

7. A film reel assembly comprising a symmetrical cylindrical hub having a longitudinal keyway therein and a tapered annular groove adjacent each end thereof, a pair of flanges adapted to be attached and detached from said hub, each of said flanges including a film guiding portion and a pair of radially and diametrically disposed latches, the ends of which are adapted to be disposed in a groove on said hub, one side of each of said ends and one side of each of said grooves having an angle to prevent forced disengagement of said flanges from said hub by pressure thereon along the axis of said hub when the ends of said latches are in said grooves, and the other side of each of said ends having an angle to permit attachment of said flanges to said hub by pressure thereon along the axis of said hub.

8. A film reel in accordance with claim 7 in which each flange includes radially positioned springs for said latches to hold the ends of said latches in their grooves, a finger relief being provided on each latch to remove the end of its latch from its groove against the tension of its spring.

References Cited in the file of this patent

UNITED STATES PATENTS

| | | |
|---|---|---|
| 872,970 | Pink | Dec. 3, 1907 |
| 968,035 | Engelhardt | Aug. 23, 1910 |
| 1,263,640 | Boylan | Apr. 23, 1918 |
| 1,366,182 | Hokanson | Jan. 18, 1921 |
| 1,378,672 | Foothorap | May 17, 1921 |
| 2,053,815 | Panthon et al. | Sept. 8, 1936 |
| 2,142,582 | Wright | Jan. 3, 1939 |
| 2,483,528 | Christoff | Oct. 4, 1949 |